US011298891B2

(12) United States Patent
Pages-Xatart et al.

(10) Patent No.: US 11,298,891 B2
(45) Date of Patent: Apr. 12, 2022

(54) METHOD AND AN INSTALLATION FOR WINDING A PRE-IMPREGNATED FABRIC STRIP ONTO A SLOPING SURFACE

(71) Applicant: ARIANEGROUP SAS, Paris (FR)

(72) Inventors: Guillaume Pages-Xatart, Le Taillan Medoc (FR); Thierry Praud, Martignas Sur Jalle (FR); Nicolas Malras, Talence (FR); Simon Deseur, Bayonne (FR)

(73) Assignee: ARIANEGROUP SAS, Paris (FR)

( * ) Notice: Subject to any disclaimer, the term of this patent is extended or adjusted under 35 U.S.C. 154(b) by 369 days.

(21) Appl. No.: 16/203,906

(22) Filed: Nov. 29, 2018

(65) Prior Publication Data
US 2019/0160760 A1     May 30, 2019

(30) Foreign Application Priority Data
Nov. 29, 2017    (FR) .......................... 1761349

(51) Int. Cl.
*B29C 70/32*     (2006.01)
*B29C 70/38*     (2006.01)
(Continued)

(52) U.S. Cl.
CPC ............ *B29C 70/32* (2013.01); *B29C 53/562* (2013.01); *B29C 70/24* (2013.01); *B29C 70/38* (2013.01);
(Continued)

(58) Field of Classification Search
CPC ...... B65H 2301/414327; B29C 53/562; B29C 70/32; B29C 70/326
(Continued)

(56) References Cited

U.S. PATENT DOCUMENTS 4,573,868 A * 3/1986 Stroem .................. F04D 29/56
                                                      415/157
6,390,169 B1    5/2002 Johnson
(Continued)

FOREIGN PATENT DOCUMENTS

| EP | 0 147 297 | 7/1985 |
| EP | 2 979 852 A1 | 2/2016 |
| FR | 2 656 826 A1 | 7/1991 |

OTHER PUBLICATIONS

Search Report as issued in French Patent Application No. 1761349, dated Sep. 6, 2018.

*Primary Examiner* — Scott W Dodds
(74) *Attorney, Agent, or Firm* — Pillsbury Winthrop Shaw Pittman LLP (57) ABSTRACT

A method of winding a pre-impregnated fabric strip onto a sloping surface includes a step of deforming the pre-impregnated fabric strip by applying differing traction forces to the pre-impregnated fabric strip, the traction forces being directed in a longitudinal direction of the strip, the values of the applied traction forces differing across the transverse direction of the strip. The differing traction forces are applied by tensioning the pre-impregnated fabric strip between firstly a pair of brake rollers and secondly a traction device present downstream from the pair of brake rollers, the traction device driving the pre-impregnated fabric strip at speeds that differ across the transverse direction of the strip. The method further includes winding the deformed strip onto a surface of revolution of winding tooling including at least one portion that forms a nonzero angle with the axis of revolution of the surface of revolution.

6 Claims, 6 Drawing Sheets

(51) Int. Cl.
*B65H 23/038* (2006.01)
*B65H 23/025* (2006.01)
*B65H 18/16* (2006.01)
*B29C 70/56* (2006.01)
*B29C 53/56* (2006.01)
*B29C 70/24* (2006.01)

(52) U.S. Cl.
CPC ............ *B29C 70/56* (2013.01); *B65H 18/16* (2013.01); *B65H 23/0251* (2013.01); *B65H 23/038* (2013.01); *B65H 2301/414327* (2013.01); *B65H 2513/104* (2013.01)

(58) Field of Classification Search
USPC .................................................. 156/173–175
See application file for complete search history.

(56) References Cited

U.S. PATENT DOCUMENTS

| | | | |
|---|---|---|---|
| 6,585,842 B1 | 7/2003 | Bompard et al. | |
| 2008/0160122 A1 | 7/2008 | Blanton et al. | |
| 2012/0007278 A1* | 1/2012 | Benson | B29C 70/54 |
| | | | 264/288.4 |
| 2013/0192749 A1* | 8/2013 | Wiles | F02K 3/06 |
| | | | 156/242 |
| 2014/0110063 A1* | 4/2014 | Mathon | B29C 53/562 |
| | | | 156/446 |

* cited by examiner

METHOD AND AN INSTALLATION FOR WINDING A PRE-IMPREGNATED FABRIC STRIP ONTO A SLOPING SURFACE

CROSS-REFERENCE TO RELATED APPLICATIONS

This application claims priority to French Patent Application No. 1761349, filed Nov. 29, 2017, the entire content of which is incorporated herein by reference in its entirety.

FIELD

The present invention relates to shaping a fiber preform by winding a strip of fabric onto a sloping surface, the preform being for fabricating composite material parts of non-developable shape.

BACKGROUND

Figure 1:
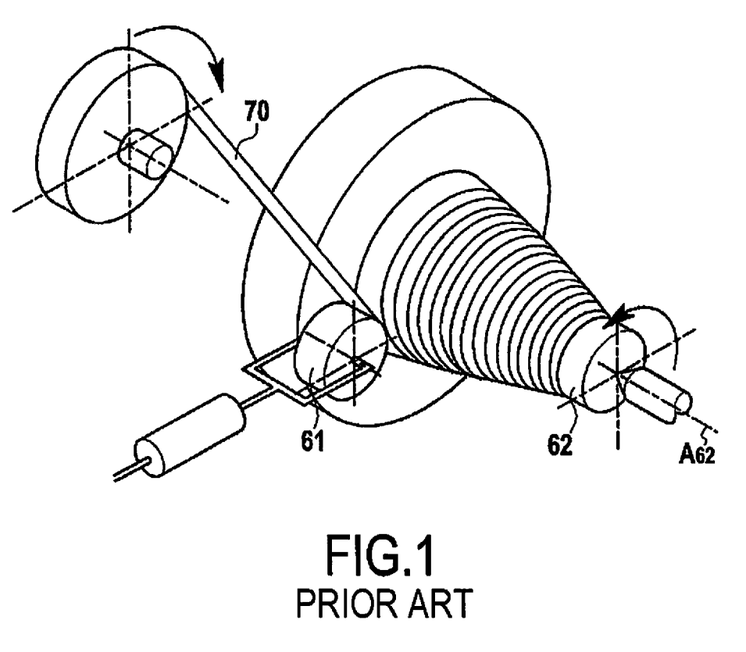
FIG. 1 is a diagrammatic view of a prior art winding installation.

As shown in FIG. 1, a known winding method consists in placing one or more strips of fabric 70 that have been pre-impregnated with a matrix-precursor resin between a presser wheel 61 and the non-developable outside surface of rotary tooling 62 rotating about an axis $A_{62}$, the fabric strip(s) presenting dimensions and fiber orientations that are defined with respect to the final composite material part that is to be made. The pre-impregnated fabric strips 70 are wound onto the tooling 62 parallel to its axis of revolution $A_{62}$.

Document EP 0 147 297 discloses a method of winding fabric strips onto a non-cylindrical rotary mandrel that is a body of revolution.

Although the above-described method can be performed in a manner that is at least semi-automatic, it nevertheless limits the quality of the preforms that can be obtained in that way. Specifically, winding strips of fabric parallel to the axis of revolution of tooling presenting the shape of a non-developable body of revolution does not enable the fabric to fit closely to the shape of the tooling, which can lead to creases in the edges of the deposited fabric strips, and consequently to irregularities in the preform that subsequently need to be machined or trimmed.

SUMMARY

It is therefore desirable to be able to have available a solution that enables pre-impregnated fabric strips to be wound onto tooling that presents at least in part a non-developable surface of revolution, with strips that fit closely to each singularity of shape in the tooling, and to do so in a manner that is automatic and repeatable.

For this purpose, an aspect of the invention proposes a method of winding a pre-impregnated fabric strip onto a sloping surface, the pre-impregnated fabric strip extending lengthwise in a longitudinal direction and widthwise in a transverse direction, the method comprising:
 a step of deforming the pre-impregnated fabric strip by applying differing traction forces to the pre-impregnated fabric strip, the traction forces being directed in the longitudinal direction of the strip, the values of the applied traction forces differing across the transverse direction of the strip, the differing traction forces being applied by tensioning the pre-impregnated fabric strip between firstly a pair of brake rollers and secondly a traction device present downstream from the pair of brake rollers, the traction device driving the pre-impregnated fabric strip at speeds that differ across the transverse direction of the strip; and
 a step of winding the deformed strip onto a surface of revolution of winding tooling including at least one portion that forms a nonzero angle with the axis of revolution of the surface of revolution.

By applying a traction force on the fabric strip that differs across the transverse direction of the strip prior to winding the strip onto a non-developable surface of revolution, the strip is deformed automatically so as to give it curvature by lengthening one of its edges relative to its other edge. The strip thus fits more easily to the non-developable shape of the winding tooling, thereby making it possible to obtain a preform that is uniform and without creases, and to do so in a manner that is automatic, reliable, and repeatable. The speed of winding can then be increased compared with a winding method that is implemented manually, thus making it possible to have a high production rate.

In an implementation of the winding method of the invention, the traction device comprises the winding tooling having a surface of revolution including at least one portion forming a nonzero angle with the axis of revolution of the surface of revolution and a winding roller having a plurality of wheels that are free to rotate independently of one another, the winding tooling being driven in rotation and the winding roller exerting contact pressure on the pre-impregnated fabric strip, which pressure is directed towards the surface of revolution of the winding tooling.

On passing between the wheels of the winding roller and the surface of the winding tooling, the fabric strip is deformed by applying thereto differing traction forces in the longitudinal direction of the strip, the wheels being driven in rotation at speeds that differ depending on their positions along the winding roller. More precisely, the wheel situated at a first end of the roller and in contact with a smaller-diameter portion of the tooling rotates at a speed that is less than the speeds of rotation of the other rollers adjacent thereto, which are in contact with portions of the tooling that are larger in diameter. Consequently, the value of the traction force applied to the strip differs across the transverse direction of the strip, since the traction device, which is formed in this example both by the winding roller and also by the winding tooling, drives the strip at speeds that differ across the transverse direction of the strip. At the outlet from the traction device, i.e. on being deposited onto the surface of the winding tooling, the strip is deformed so as to give it curvature. Thus, after being deformed, the pre-impregnated fabric strip fits closely to the shape of the sloping surface of the winding tooling.

In another implementation of the winding method of the invention, the traction device comprises first and second drive rollers, each comprising a plurality of wheels, the wheels of the first drive roller being placed facing respective wheels of the second drive roller, the wheels of the first drive roller being driven in rotation at different speeds of rotation, while the wheels of the second drive roller are free to rotate independently of one another, the first drive roller exerting contact pressure directed towards the second drive roller, or vice versa.

The fabric strip is deformed on passing between the drive rollers, which drive the strip at speeds that differ across the transverse direction of the strip. The speed of each facing pair of wheels of the drive rollers can be defined as a function of the shape of the surface of the winding tooling onto which the strip is to be deposited. Thus, after being deformed, the pre-impregnated fabric strip fits closely to the shape of the sloping surface of the winding tooling.

According to a particular characteristic of the method of the invention, before or during the deformation step, the method further comprises a step of heating the fabric strip pre-impregnated with a resin to a temperature that is higher than or equal to the softening temperature of the resin. This serves to facilitate deforming the pre-impregnated fabric strip, in particular when its impregnation resin presents a softening temperature that is significantly higher than ambient temperature. The softening temperature of the resin corresponds to the temperature at which it begins to become sufficiently fluid, e.g. pasty or liquid, to facilitate deforming the strip. Nevertheless, the softening temperature is lower than the temperature at which the resin begins to polymerize.

An aspect of the invention also provides an installation for winding a pre-impregnated fabric strip onto a sloping surface, the installation comprising winding tooling presenting a surface of revolution including at least one portion forming a nonzero angle with the axis of revolution of the surface of revolution and a deformation device present downstream from the winding tooling, the deformation device comprising a pair of brake rollers and a traction device present downstream from the pair of brake rollers, the traction device being suitable for driving the pre-impregnated fabric strip at speeds that differ across the transverse direction of the strip.

In an embodiment of the installation of the invention, the traction device comprises a winding roller having a plurality of wheels that are free to rotate independently of one another, the winding roller exerting contact pressure directed towards the surface of revolution of the winding tooling. In a particular aspect of this embodiment, the wheels of the winding roller are supported by a shaft that is suitable for deforming so as to avoid pinching-type side effects in the strips.

In another embodiment of the installation of the invention, the traction device comprises first and second drive rollers, each comprising a plurality of wheels, the wheels of the first drive roller being placed facing respective wheels of the second drive roller, the first drive roller exerting contact pressure directed towards the second roller, or vice versa.

According to a particular characteristic of the installation of the invention, it further comprises a heater device present upstream from the traction device or integrated therewith.

BRIEF DESCRIPTION OF THE DRAWINGS

Other characteristics and benefits of the invention appear from the following description of particular embodiments of the invention, given as nonlimiting examples, and with reference to the accompanying drawings, in which.

DETAILED DESCRIPTION

The invention applies in general manner to winding a strip of pre-impregnated fabric onto a sloping surface in order to make a composite material part that corresponds particularly, but not exclusively, to a part in the form of a body of revolution, such as a rocket engine diverging portion.

Figure 2:
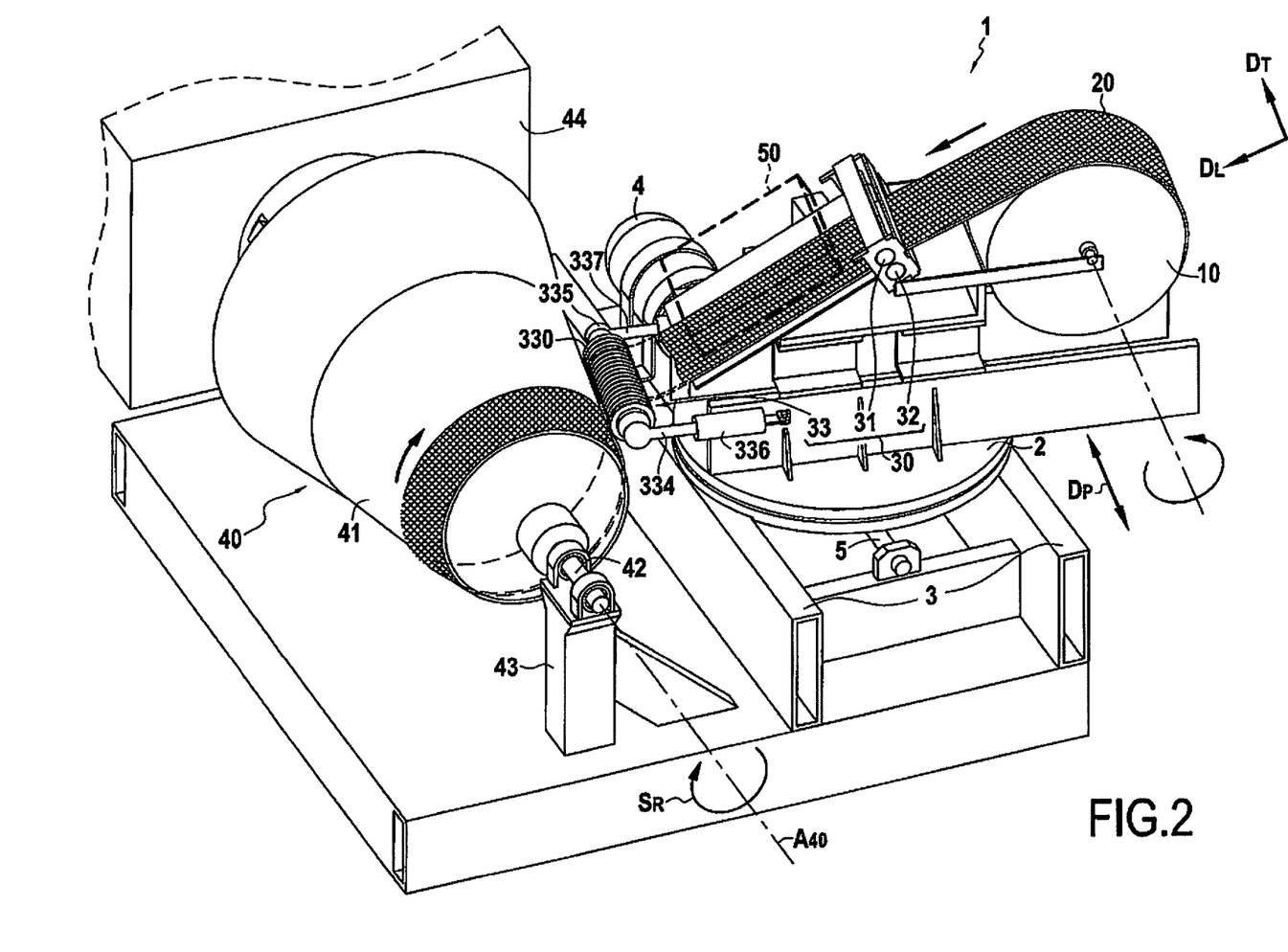
FIG. 2 is a diagrammatic perspective view of a first embodiment of an installation of the innovation for winding a pre-impregnated strip of fabric.
Figure 3:
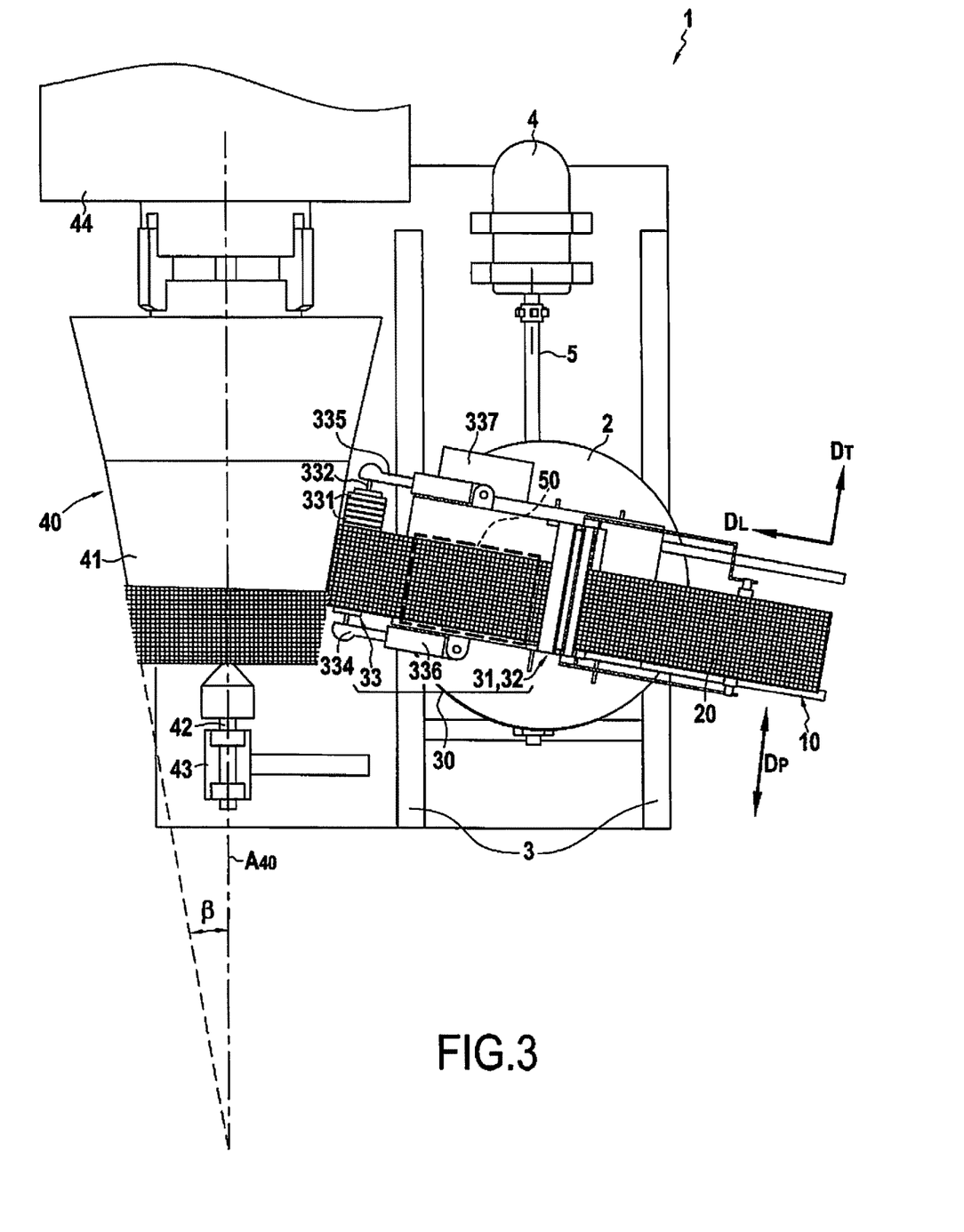
FIG. 3 is a plan view from above of the FIG. 2 installation.

FIGS. 2 and 3 show an embodiment of an installation 1 of the invention for winding a strip of pre-impregnated fabric. The installation 1 comprises a reel 10 storing a pre-impregnated fabric strip 20, a deformation device 30 downstream from the reel 10, and winding tooling 40, referred to as a "mandrel", downstream from the deformation device 30 and onto which the pre-impregnated fabric strip 20 is to be wound.

Figure 4:
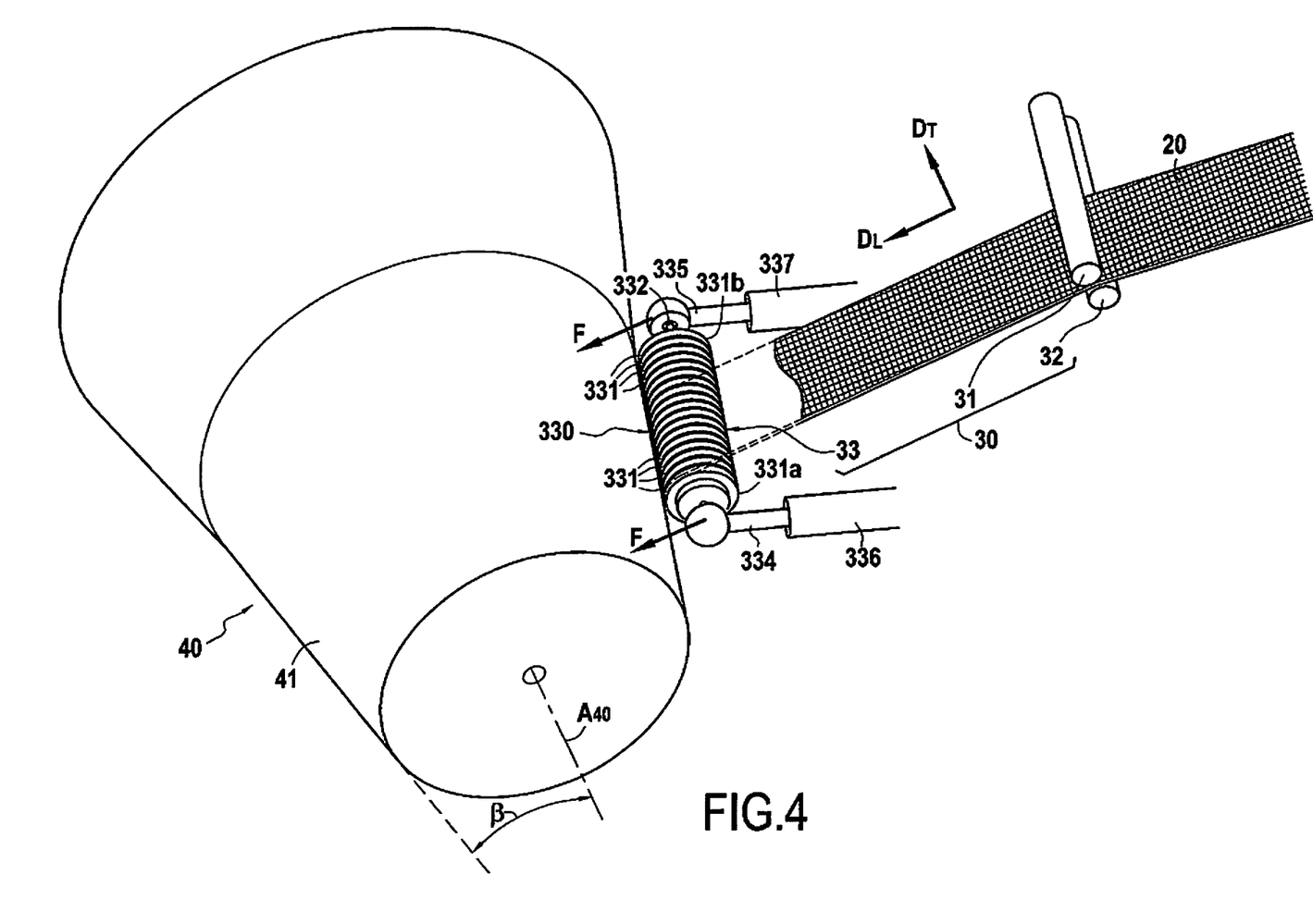
FIG. 4 is an enlarged view of the deformation device of the FIG. 2 installation.

The deformation device 30 has a pair of brake rollers 31 and 32, and a traction device 33 present downstream from the pair of brake rollers, the traction device 33 being suitable for driving the pre-impregnated fabric strip at speeds that differ across the transverse direction of the strip. For this purpose, in the presently described example and as shown in FIG. 4, the traction device comprises a winding roller 330 that is made up of a plurality of adjacent wheels 331 that are free to rotate independently of one another. In the presently described example, each wheel 331 is mounted on a shaft 332 of the winding roller 330 via its own bearing (not shown in FIGS. 2 to 4) allowing it to be driven in rotation independently of the other wheels present on the shaft 332. The winding roller is held by two arms 334 and 335 that are connected to the respective ends of the shaft 332. The arms 333 and 335 are connected to an actuation system, e.g. two actuators 336 and 337, serving to exert a force F on the winding roller that is directed towards the surface of revolution 41 of the mandrel 40. In this way, the winding roller 330 acts via the wheels 331 to exert contact pressure on the surface of revolution 41 of the mandrel 40.

The surface of revolution 41 slopes relative to its axis of revolution $A_{40}$, i.e. it forms a nonzero angle β relative to the axis $A_{40}$ that also corresponds to the axis of rotation of the mandrel 40. The mandrel 40 is mounted on a rotary shaft 42 that, in the presently described example, is supported by a motorized stand 43 and a tailstock 44 for driving the mandrel 40 in rotation in the direction shown by the arrow $S_R$ in FIG. 2.

The reel 10 and the deformation device 30, including the pair of brake rollers 31 and 32 and the traction device 33 (winding roller 330), are mounted on a carriage platform 2 that stands on the rails 3, the carriage platform 2 being suitable for moving progressively on the rails 33 in the two directions shown by double-headed arrow $D_P$ in FIG. 2 while the winding is taking place. The carriage platform 2 is also suitable for moving in the direction $D_L$ so as to track the thickness and the profile of the deposited strip. In the presently described example, the carriage platform 2 is connected to a wormscrew 5 driven by a motor 4 so as to move the platform in both directions. The carriage platform 2 could be connected to any other hydraulic linear axis system.

While the pre-impregnated fabric strip 20 is being wound on the surface 41 of the mandrel 40, the strip 20 is kept pressed against the surface 41 by the winding roller 330. On passing between the wheels 331 of the winding roller 330 and the surface 41 of the mandrel 40, the strip 20 is deformed by applying differing traction forces thereto, all acting in the longitudinal direction $D_L$ of the strip. Differing traction forces are applied to the pre-impregnated fabric strip 20 by tensioning it between firstly the pair of brake rollers 31 and 32 that restrain the strip 20, and secondly the winding roller 330 that exerts contact pressure on the strip 20, which pressure is directed towards the surface of revolution 41 of the mandrel 40.

Furthermore, the wheels 331 are driven in rotation at speeds that differ depending on their positions along the winding roller. More precisely, the wheel 331a situated at a first end of the roller 330 (FIG. 4) and in contact with a smaller-diameter portion of the tooling 40 rotates at a speed that is less than the speeds of rotation of the other rollers 331 adjacent thereto, which are in contact with portions of the tooling 40 that are larger in diameter. The wheel 331b situated at the second end of the roller 330 (FIG. 4) corresponds to the wheel having the fastest speed of rotation, as contrasted to the wheel 331a that has the slowest speed of rotation. Consequently, the value of the traction force applied to the strip 20 differs across the transverse direction $D_T$ of the strip since the traction device 33, formed in this example by the winding roller 330, drives the strip 20 at speeds that differ across the transverse direction of the strip.

In other words, the two brake rollers 31 and 32, between which the pre-impregnated fabric strip 20 passes, exert a braking or restraining force over the entire width of the strip 20, i.e. across the transverse direction $D_T$ of the strip 20. This braking or restraining force associated with the strip being subjected to drive at differing speeds downstream from the brake rollers serves to obtain the desired deformation.

Figure 5:
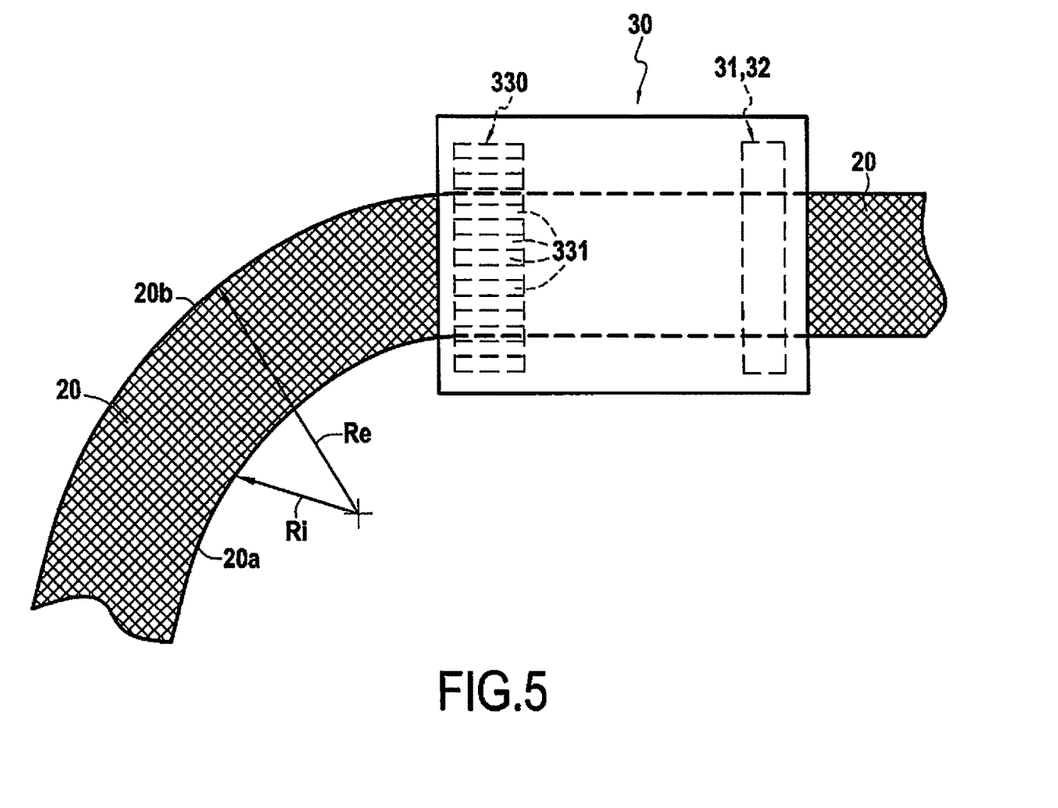
FIG. 5 is a diagrammatic view showing the deformation of a pre-impregnated strip after it has passed through the deformation device of the FIG. 2 installation.

At the outlet from the deformation device 30, i.e. while it is being deposited on the surface 41 of the mandrel 40, the strip 20 is deformed so as to give it curvature and lengthen its outside edge 20b relative to its inside edge 20a, as shown in FIG. 5. FIG. 5 shows the strip 20 after it has been deformed, i.e. at the outlet from the deformation device 30. After being deformed, the strip 20 presents a curved shape of substantially constant width between its inside edge 20a corresponding to the inside radius $R_i$ of the curved strip 20 and its outside edge 20b corresponding to the outside radius $R_e$ of the curved strip 20. Thus, after being deformed, the pre-impregnated fabric strip 20 fits perfectly to the shape of the sloping surface 41 of the mandrel 40.

The strip 20 is a two-dimensional or three-dimensional fabric strip that is made in particular out of carbon (C) fibers, Kevlar fibers, ceramic fibers, e.g. silica fibers, glass fibers, or silicon carbide (SiC) fibers, and it has previously been pre-impregnated with a resin that may be selected in particular from the following resins: epoxy resin, or matrix-precursor resin, e.g. a precursor for carbon (c) or for silicon carbide (SiC).

In the presently described example, the installation 1 also has a heater device 50 that is present upstream from the traction device, i.e. that is interposed between the brake rollers 31 and 32 and the winding roller 330. By way of example, the heater device may be provided with heater resistances or with infrared heater lamps. The heater device is for making the pre-impregnated fabric strip easier to deform by heating it to a temperature close to the softening temperature of the impregnation resin.

Nevertheless, the heater device is not essential, since deformation can be obtained merely by applying the differing traction forces on the strip.

In a particular aspect of the invention, the shaft 332 of the winding roller is deformable, e.g. by using a deformable material for the shaft or by providing it with a hinged structure. Under such circumstances, the winding roller can fit even more easily to the shape of the winding surface of the mandrel, in particular when it presents varying slopes.

Figure 6:
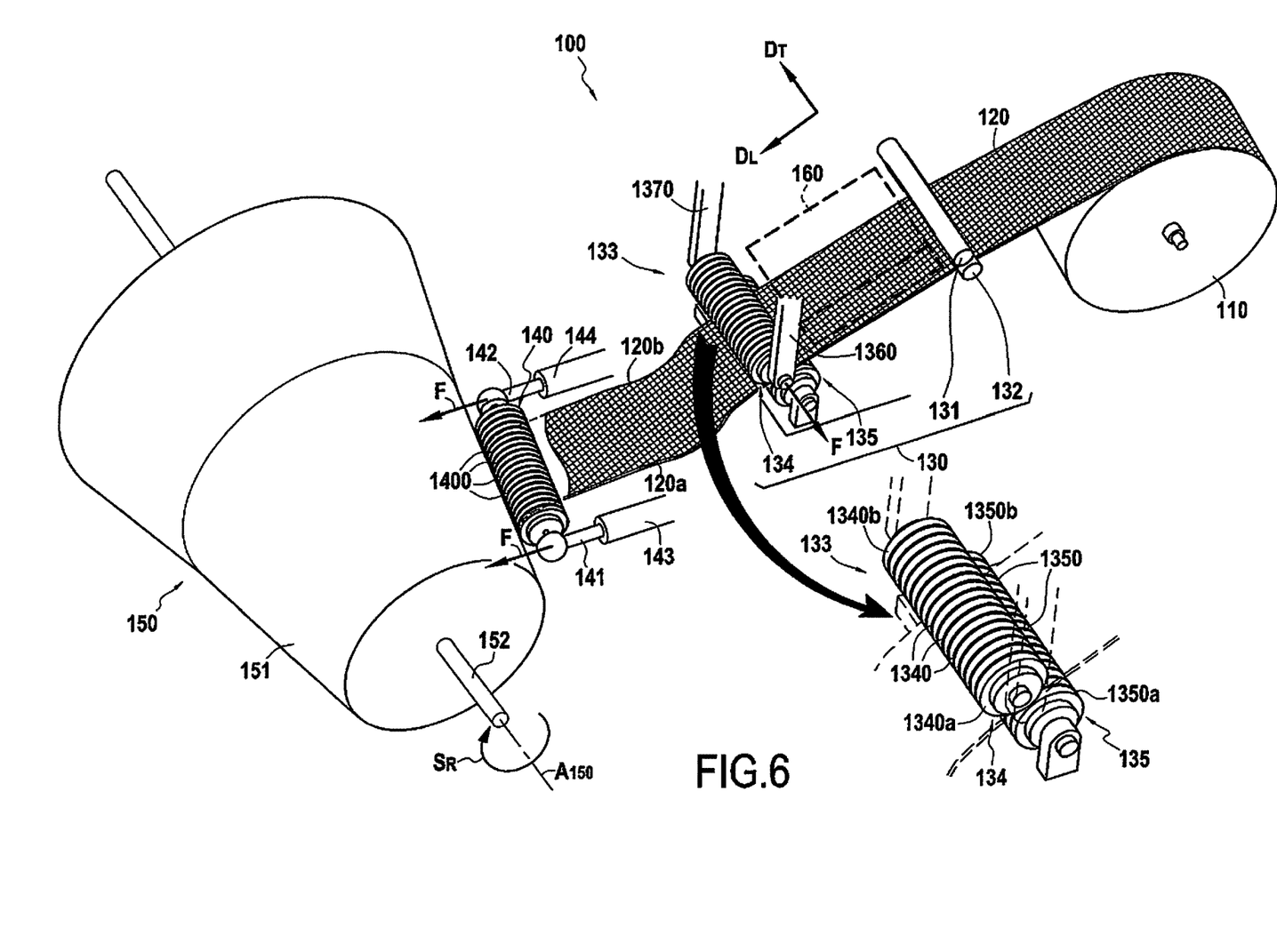
FIG. 6 is a diagrammatic perspective view of a second embodiment of an installation of the invention for winding a pre-impregnated strip of fabric.

FIG. 6 shows another winding insulation that differs from the installation described above in that the functions of deforming the pre-impregnated fabric strip and of winding are separated. FIG. 6 shows an embodiment of an installation 100 of the invention for winding a strip of pre-impregnated fabric. The installation 100 comprises a reel 110 storing a pre-impregnated fabric strip 120, a deformation device 130 downstream from the reel 110, and winding tooling 140, referred to as a "mandrel" 150, downstream from the deformation device, and on which the pre-impregnated fabric strip 120 is to be wound.

The reel 110, the deformation device 130, and the winding roller 140 are mounted on a carriage platform (not shown in FIG. 6) similar to the carriage platform 2 described above with reference to FIGS. 2 and 3, for the purpose of moving these elements progressively as winding takes place along with the surface of revolution 151 of the mandrel 150. The mandrel 150 is mounted on a rotary shaft 152 supported by two stands (not shown in FIG. 6) at least one of which includes a motor for driving the mandrel 150 in rotation in the direction shown by the arrow $S_R$ in FIG. 6 and about an axis of rotation $A_{150}$ corresponding to the axis of revolution of the mandrel 150.

The deformation device 130 has a pair of brake rollers 131 and 132, and a traction device 133 present downstream from the pair of brake rollers, the traction device 133 being suitable for driving the pre-impregnated fabric strip at speeds that differ across the transverse direction of the strip. For this purpose, in the presently described example, the traction device 133 comprises first and second drive rollers 134 and 135 present downstream from the brake rollers 131 and 132. The first drive roller 134 is made up of a plurality of adjacent wheels 1340 that are driven in rotation independently of one another, e.g. by means of shafts engaged one in another, each shaft being driven by a dedicated motor. The second drive roller 135 is made up of a plurality of adjacent wheels 1350 that are free to rotate independently of one another, each wheel 1350 being mounted on a shaft 1352 via its own bearing (not shown in FIG. 6) allowing it to be driven in rotation independently of the other wheels present on the shaft 1352. The wheels 1340 of the first drive roller 134 are placed facing the wheels 1350 of the second drive roller 135. The first drive roller 134 is mounted on two arms 1360 and 1370. The arms 1360 and 1370 are connected to an actuation system, such as actuators, for example, serving to exert a force F on the first drive roller 134, which force is directed towards the second drive roller 135 that is held in a fixed position. In this way, the first drive roller 134 acts on the wheels 1340 to exert contact pressure on the wheels 1350 of the second drive roller 135. In a variant implementation, the second drive roller is connected to arms of an actuation system, e.g. actuators, so as to exert a force on the first drive roller, which force is directed towards the first drive roller that is held in a stationary position.

The winding roller 140 is likewise made up of a plurality of wheels 1400 that are free to rotate independently of one another. The winding roller 140 is held by two arms 141 and 142 that are connected to an actuation system, e.g. such as actuators 143 and 144, serving to exert a force F on the winding roller, which force is directed towards the surface of revolution 151 of the mandrel 150. In this way, the winding roller 140 acts via the wheels 1400 to exert contact pressure on the surface of revolution 151 of the mandrel 150 serving to compact the pre-impregnated fabric strip 120 while it is being wound on the mandrel 150. The surface of revolution 151 slopes relative to its axis of revolution $A_{150}$, i.e. it forms a nonzero angle relative to the axis $A_{150}$ that also corresponds to the axis of rotation of the mandrel 150.

On passing between the drive rollers 134 and 135, the strip 120 is deformed by applying traction forces onto the strip that differ across the longitudinal direction $D_L$ of the strip. The differing traction forces are applied onto the pre-impregnated fabric strip 120 by putting it under tension between firstly the pair of brake rollers 131 and 132 that restrain the strip 120, and secondly the drive rollers 134 and 135 having wheels that are driven in rotation at different speeds.

More precisely, by way of nonlimiting example, the facing pair of wheels 1340a and 1350a situated at a first end of the rollers 134 and 135 rotate at a speed that is slower than the speeds of rotation of the other facing pairs of wheels of the adjacent rollers 134 and 135. The facing wheels 1340b and 1350b situated at the second end of the rollers 134 and 135 correspond to the wheels having the fastest speed of rotation, as contrasted with the wheels 1340a and 1350a that have the slowest speed of rotation, with the facing wheels situated between the pairs of wheels 1340a & 1350a and 1340b & 1350b having speeds of rotation that increase progressively between the pair of wheels 1340a & 1350a and the pair of wheels 1340b & 1350b. Consequently, the value of the traction force applied to the strip 120 differs across the transverse direction $D_T$ of the strip since the traction device 133, formed in this example by the winding rollers 134 and 135, drives the strip 120 at speeds that differ across the transverse direction $D_T$ of the strip.

The speed of each facing pair of wheels 1340 and 1350 of the drive rollers 134 and 135 is defined as a function of the shape of the surface 151 of the mandrel 150 onto which the strip 120 is to be deposited. Thus, at the outlet from the deformation device 130, i.e. before passing between the winding roller 150 and the surface of revolution 151 of the mandrel 150, the strip 120 is deformed in such a manner as to give it curvature and lengthen its outside edge 120b relative to its inside edge 120a. Thus, after being deformed, the pre-impregnated fabric strip 120 fits perfectly to the shape of the sloping surface 151 of the mandrel 150.

While the pre-impregnated fabric strip 120 is being wound onto the surface 151 of the mandrel 150, the strip 120 is kept pressed against the surface 151 by the winding roller 140.

In the presently described example, the installation 100 also comprises a heater device 160 integrated in the traction device, i.e. present between the brake rollers 131 and 132 and the drive rollers 134 and 135 such that the pre-impregnated fabric strip is heated during the deformation step. By way of example, the heater device may be provided with heater resistances or with infrared heater lamps. The heater device is for making the pre-impregnated fabric strip easier to deform by heating it to a temperature close to the softening temperature of the impregnation resin.

Nevertheless, the heater device is not essential, since deformation can be obtained merely by applying the differing traction forces on the strip.

The invention claimed is:

1. An installation for winding a pre-impregnated fabric strip onto a sloping surface, the installation comprising:
   a winding tooling having a first end and a second end and presenting a surface of revolution comprising said sloping surface and including at least one tapering portion forming a nonzero angle with an axis of revolution of the surface of revolution, wherein the at least one tapering portion of the surface of revolution tapers to one of the first or second ends of the winding tooling, and
   a deformation device present upstream relative to the winding tooling, the deformation device comprising a pair of brake rollers and a traction device present downstream from the pair of brake rollers, the traction device being configured for driving the pre-impregnated fabric strip at speeds that differ across the transverse direction of the strip, wherein the traction device is positioned along a rotation axis that is non-parallel to the axis of revolution and substantially parallel to the sloping surface so as to exert contact pressure on the strip and towards the surface of revolution of the winding tooling as the strip is applied thereto.

2. The installation according to claim 1, wherein the traction device comprises a winding roller having a plurality of wheels that are free to rotate independently of one another about said rotation axis, the plurality of wheels of the winding roller being configured to exert the contact pressure directed towards the surface of revolution of the winding tooling and the strip at differing speeds in the transverse direction so as to cause deformation of said strip such that the strip fits closely to a shape of the sloping surface of the winding tooling.

3. The installation according to claim 1, further comprising a heater device present upstream from the traction device or integrated therewith.

4. The installation according to claim 2, wherein the wheels of the winding roller are supported by a shaft that is suitable for deforming.

5. A method of winding a pre-impregnated fabric strip onto a sloping surface of a winding tooling having a first end and a second end, the pre-impregnated fabric strip extending lengthwise in a longitudinal direction and widthwise in a transverse direction, the method comprising:
   deforming the pre-impregnated fabric strip by applying differing traction forces to the pre-impregnated fabric strip, the traction forces being directed in the longitudinal direction of the strip, the values of the applied traction forces differing across the transverse direction of the strip, the differing traction forces being applied by tensioning the pre-impregnated fabric strip between firstly a pair of brake rollers and secondly a traction device present downstream from the pair of brake rollers, the traction device driving the pre-impregnated fabric strip at speeds that differ across the transverse direction of the strip; and
   winding the strip onto a surface of revolution of the winding tooling comprising said sloping surface and including at least one tapering portion that forms a nonzero angle with an axis of revolution of the surface of revolution, the at least one tapering portion of the surface of revolution tapering to one of the first or second ends of the winding tooling,
   wherein the traction device is positioned along a rotation axis that is non-parallel to the axis of revolution and substantially parallel to the sloping surface so as to exert contact pressure on the strip and towards the surface of revolution of the winding tooling as the strip is applied thereto.

6. The method according to claim 5, further comprising, before or during the deformating, heating the fabric strip pre-impregnated with a resin to a temperature that is higher than or equal to the softening temperature of the resin.

* * * * *